July 21, 1931.  J. P. KOPETKA  1,815,512
HOG FEEDER
Filed Aug. 22, 1930    2 Sheets-Sheet 1
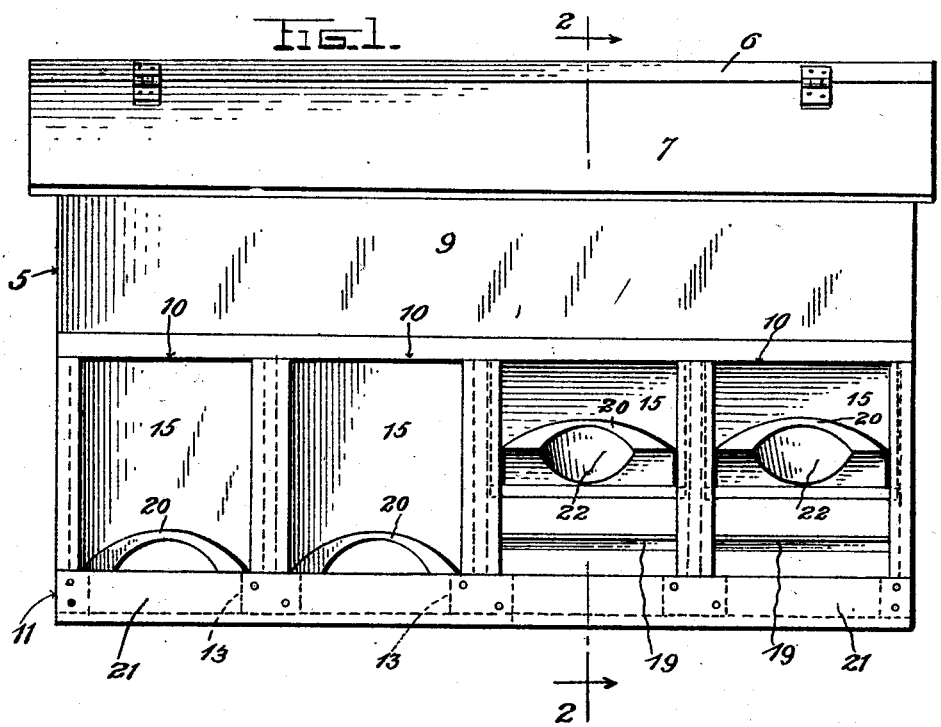
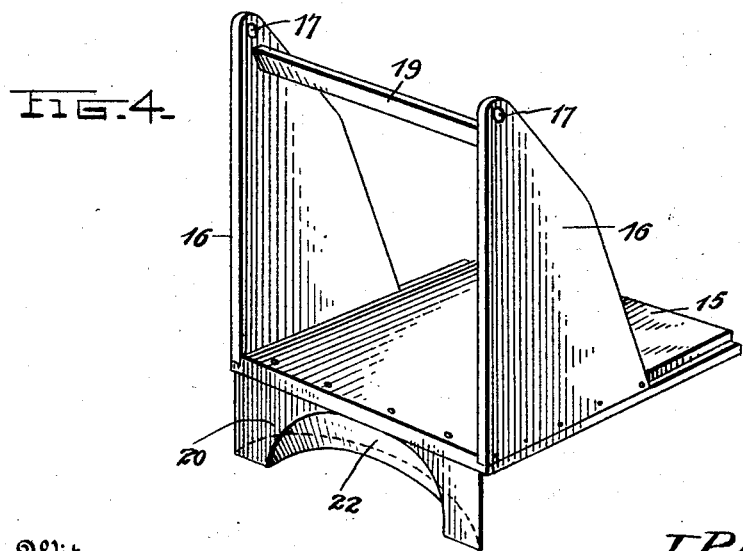
Inventor
J. P. Kopetka July 21, 1931. J. P. KOPETKA 1,815,512
HOG FEEDER
Filed Aug. 22, 1930 2 Sheets-Sheet 2
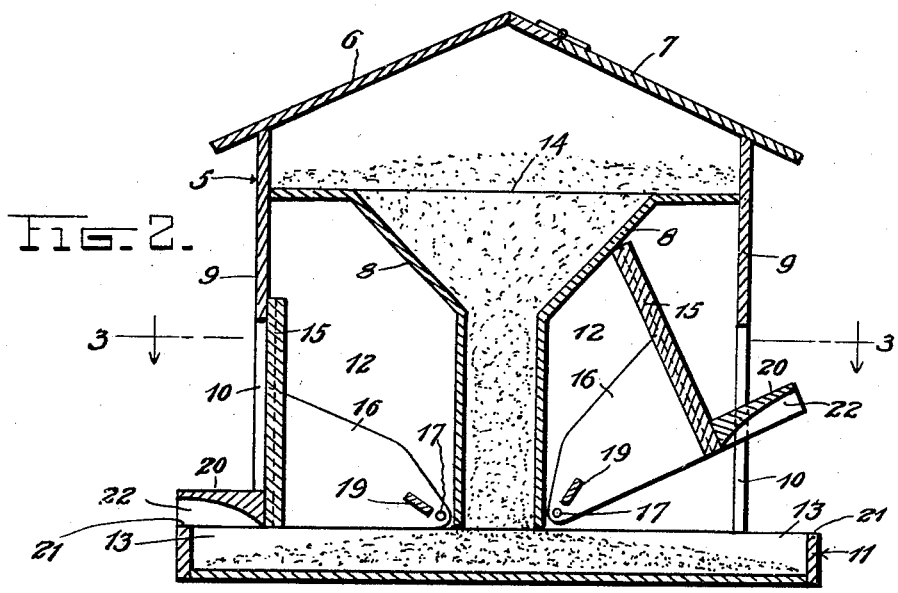
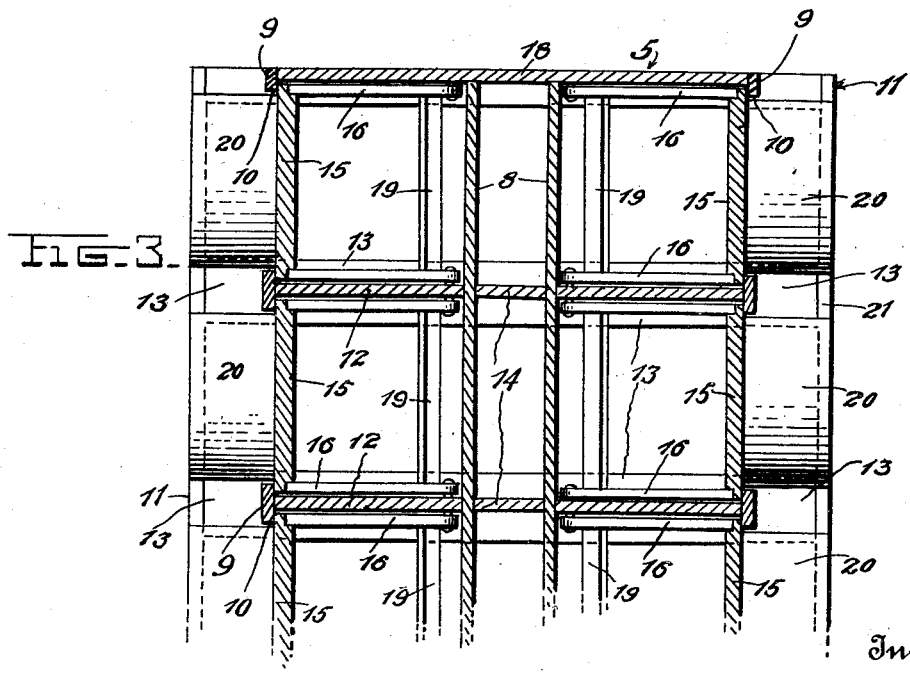
Inventor
J. P. Kopetka Patented July 21, 1931

1,815,512

UNITED STATES PATENT OFFICE

JOSEPH P. KOPETKA, OF BLOOMFIELD, NEBRASKA

HOG FEEDER

Application filed August 22, 1930. Serial No. 477,163.

The invention aims to provide a new and improved hog feeder which will effectively protect the feed, yet will readily allow the hogs to have access thereto.

With the foregoing in view, the invention resides in the novel subject matter hereinafter described and claimed, description being accomplished by reference to the accompanying drawings.

Fig. 1 is an elevation of a feeder constructed in accordance with my invention, some of the doors being closed and others open.

Fig. 2 is a vertical transverse sectional view on line 2—2 of Fig. 1.

Fig. 3 is a fragmentary horizontal sectional view on line 3—3 of Fig. 2, all of the doors however being closed.

Fig. 4 is a perspective view showing one of the doors turned from its normal position.

A preferred construction has been illustrated and while such construction will be hereinafter specifically described, it is to be understood that within the scope of the invention as claimed, numerous variations may be made.

The numeral 5 denotes a housing having a roof 6 embodying a hinged door 7 allowing filling of a feed hopper 8 which is disposed within and extends centrally and longitudinally of said housing. This housing 5 embodies two parallel vertical side walls 9 each having a plurality of doorways 10 in its lower portion. The entire housing is rigidly mounted upon a horizontal feed trough 11 which projects outwardly beyond the side walls 9. Extending from these side walls to the hopper 8 and disposed at opposite sides of the doorways 10, are a plurality of transverse vertical walls 12, and in the present showing, these walls rise from transverse dividers 13 with which the trough 11 is provided. The hopper 8 may also be divided by partitions 14 if desired, allowing different kinds of feed to be placed in different portions of said hopper should this be required.

Vertically disposed doors 15 are provided for the doorways 10, said doors normally lying against the inner faces of the side walls 9 as seen at the left of Fig. 2 and in Fig. 3. Each door is provided with a pair of inwardly projecting wings or other members 16 which are rigid therewith, said members being pivoted at 17 to the transverse walls 12 and to the end walls 18 of the housing 5, thereby mounting the doors 15 to swing upwardly and inwardly as shown at the right of Figs. 1 and 2. The members 16 are so spaced that they cannot bind frictionally against the parts 12 and 18, and their inner portions are held in this spaced relation, by horizontal tie members 19.

Cowls 20 are rigidly secured to the lower ends of the doors 15 and project outwardly therefrom, said cowls normally lying upon the dividers 13 and the outer side walls 21 of the trough 11. The lower sides 22 of these cowls however, are concave, allowing hogs to insert their snouts thereunder. Hence, the hogs may effect upward and inward swinging of the doors 15 as shown at the right of Figs. 1 and 2 and consequently they may have access to the feed reaching the trough 11 from the hopper 8.

It will be seen from the foregoing that a simple and inexpensive construction has been provided for holding a large quantity of feed and normally protecting it against weather conditions, yet that the hogs may have easy access to said feed and may conveniently eat. As soon as any hog withdraws its head from the trough, the door and cowl which have been held open during eating, drop by gravity to closed positions, so that there is no danger of the feed remaining exposed.

Attention is again invited to the fact that within the scope of the invention as claimed, variations may be made, and it may be further explained that the feeder may be made in any desired size or sizes with one or more of the doors 15 and associated features of construction.

I claim:—

1. In a hog feeder, a feed trough, an upwardly and rearwardly swingable vertical door over and spaced rearwardly from the front end of said trough, and a weather excluding cowl rigidly secured to the lower end of said door and hence movable bodily with the latter, said cowl projecting forwardly from the door over the front end of the trough and being adapted to be raised by a hog's snout.

2. A structure as specified in claim 1; said cowl having a concave lower side permitting the hog to insert his snout thereunder.

3. In a hog feeder, a feed trough, a vertical door over and spaced rearwardly from the front end of said trough, said door having a rearwardly projecting portion rigid therewith, means pivotally mounting said rearwardly projecting portion and allowing the door to move upwardly and rearwardly, and a weather excluding cowl rigidly secured to the lower end of said door and hence movable bodily with the latter, said cowl projecting forwardly from the door over the front end of the trough and being adapted to be raised by a hog's snout.

4. A structure as specified in claim 3; said cowl having a concave lower side permitting the hog to insert his snout thereunder.

5. A hog feeder comprising a hopper, a trough communicating with the lower end of said hopper and projecting horizontally outward therefrom, two opposed vertical walls projecting outwardly from said hopper, a vertical door extending between said vertical walls and spaced horizontally inward from the outer end of said trough, two spaced members rigid with said door and projecting toward said hopper, means pivoting said members to said walls and thereby mounting said door for upward and inward swinging, and a cowl rigidly secured to the lower end of said door and projecting outwardly over the outer portion of the trough, said cowl being adapted to be raised by a hog's snout.

6. In a hog feeder, a housing having a door opening in its front wall, a hopper spaced behind said front wall and a trough supplied with feed from the hopper and extending forwardly beyond said front wall, a vertical door normally closing said door opening, means mounting said door for upward and rearward opening, and a weather-excluding cowl rigidly secured to the lower end of said door and hence movable bodily with the latter, said cowl projecting forwardly over the front portion of said trough and being adapted to be raised by a hog's snout.

In testimony whereof I affix my signature.

JOSEPH P. KOPETKA.